US012599974B2

(12) United States Patent
Zierden

(10) Patent No.: US 12,599,974 B2
(45) Date of Patent: Apr. 14, 2026

(54) MOUNTING BRACKET TEMPLATE SUPPORT AND METHOD

(71) Applicant: Daniel Zierden, Fergus Falls, MN (US)

(72) Inventor: Daniel Zierden, Fergus Falls, MN (US)

( * ) Notice: Subject to any disclaimer, the term of this patent is extended or adjusted under 35 U.S.C. 154(b) by 476 days.

(21) Appl. No.: 18/206,703

(22) Filed: Jun. 7, 2023

(65) Prior Publication Data

US 2024/0408679 A1 Dec. 12, 2024

(51) Int. Cl.
*B23B 47/28* (2006.01)

(52) U.S. Cl.
CPC .................................. *B23B 47/287* (2013.01)

(58) Field of Classification Search
CPC ...................................................... B23B 47/287
USPC ........................................... 33/563, 613, 645
See application file for complete search history.

(56) References Cited

U.S. PATENT DOCUMENTS

| | | | | |
|---|---|---|---|---|
| 3,434,385 A | | 3/1969 | Ray | |
| 4,666,113 A | * | 5/1987 | Itoh ......................... | H05B 6/642 |
| | | | | 219/762 |
| 5,107,601 A | * | 4/1992 | Semchuck ............. | A47K 10/10 |
| | | | | 33/759 |
| 5,390,422 A | * | 2/1995 | Hill .......................... | G01B 5/14 |
| | | | | 33/645 |
| 5,392,524 A | * | 2/1995 | Hill .......................... | G01B 5/14 |
| | | | | 33/645 |
| 5,494,089 A | | 2/1996 | Lubbe | |

| | | | | |
|---|---|---|---|---|
| 5,887,388 A | * | 3/1999 | Hempel ................... | F24B 1/198 |
| | | | | 52/27 |
| 6,374,505 B2 | * | 4/2002 | Myers ....................... | E05F 3/00 |
| | | | | 33/562 |
| 6,516,531 B2 | * | 2/2003 | Woerlein ................. | A47K 3/02 |
| | | | | 33/645 |
| 6,834,438 B1 | * | 12/2004 | Heister ............... | E04F 21/0076 |
| | | | | 33/526 |
| 6,845,699 B1 | | 1/2005 | Anton | |
| 7,343,692 B2 | * | 3/2008 | Gould ...................... | H02G 3/00 |
| | | | | 33/645 |
| 7,392,594 B2 | * | 7/2008 | Kesler ...................... | G01C 9/26 |
| | | | | 33/528 |
| 7,856,732 B2 | * | 12/2010 | Townsend .............. | F16M 13/02 |
| | | | | 33/613 |
| 7,891,108 B1 | * | 2/2011 | Cordobes .............. | B43L 13/206 |
| | | | | 33/528 |
| 9,523,507 B2 | * | 12/2016 | Bruin-Slot .......... | F24F 13/0254 |

(Continued)

FOREIGN PATENT DOCUMENTS

| | | |
|---|---|---|
| WO | WO0054990 | 3/1999 |
| WO | WO2021003981 | 6/2019 |

*Primary Examiner* — George B Bennett

(57) ABSTRACT

A template positioning device for use in preparing a cabinet for mounting of an under-cabinet microwave includes a panel, which is substantially rigid, rectangular, and planar. The panel overlays and is removably attached to a template that is used in mounting an under-cabinet microwave, with a first edge of the panel being aligned with a rear edge of the template. The panel has a plurality of cutouts positioned therein, with respective cutouts allowing access to associated mounting indicators of the template. The panel facilitates proper positioning of the template in abutment to an underside of a cabinet, using one hand, with the first edge of the panel against a wall to which the cabinet is mounted. The device allows a user to use their other hand to drill holes corresponding to respective mounting indicators.

8 Claims, 8 Drawing Sheets

(56) References Cited

U.S. PATENT DOCUMENTS

| 9,539,650 | B2 * | 1/2017 | Frick | B23B 47/287 |
| 9,897,330 | B2 * | 2/2018 | Bruin-Slot | F24C 15/2071 |
| 10,018,365 | B2 * | 7/2018 | Bruin-Slot | A47B 77/08 |
| 10,857,600 | B2 * | 12/2020 | Wilson | B23B 39/26 |
| 11,517,988 | B2 | 12/2022 | Sheldon | |
| 11,524,376 | B2 | 12/2022 | Sheldon | |
| 2005/0236069 | A1 | 10/2005 | O'Brien | |
| 2025/0242419 | A1 * | 7/2025 | Happes | B65D 85/70 |

* cited by examiner

68

70
Attaching the panel to the template

72
Positioning the template in abutment to the underside of the cabinet

74
Drilling holes corresponding to the respective mounting indicators

MOUNTING BRACKET TEMPLATE SUPPORT AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to template holders and more particularly pertains to a new template holder for use in preparing a cabinet for mounting of an under-cabinet microwave. Templates provided for use in mounting under-cabinet microwaves typically are printed on pliable paper stock and cannot easily be held in position on an underside of a cabinet to which the under-cabinet microwave is to be mounted.

(2) Description of Related Art Including Information Disclosed Under 37 CFR 1.97 and 1.98

The prior art relates to template holders and does not teach a rigid panel having a plurality of cutouts positioned therein, wherein the cutouts allow access to mounting indicators of a template attached to the panel.

BRIEF SUMMARY OF THE INVENTION

An embodiment of the disclosure meets the needs presented above by generally comprising a panel, which is substantially rigid, rectangular, and planar. The panel is configured to overlay and to be removably attached to a template that is used in mounting an under-cabinet microwave, with a first edge of the panel being aligned with a rear edge of the template. The panel has a plurality of cutouts positioned therein, with respective cutouts allowing access to associated mounting indicators of the template. The panel is configured to facilitate proper positioning of the template in abutment to an underside of a cabinet, using one hand, with the first edge of the panel against a wall to which the cabinet is mounted. The device allows a user to use their other hand to drill holes corresponding to respective mounting indicators.

Another embodiment of the disclosure includes a method of preparing a cabinet for mounting an under-cabinet microwave. Steps of the method include attaching the panel to the template, positioning the template in abutment to the underside of the cabinet, and drilling holes corresponding to the respective mounting indicators of the template.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figures 1, 2:
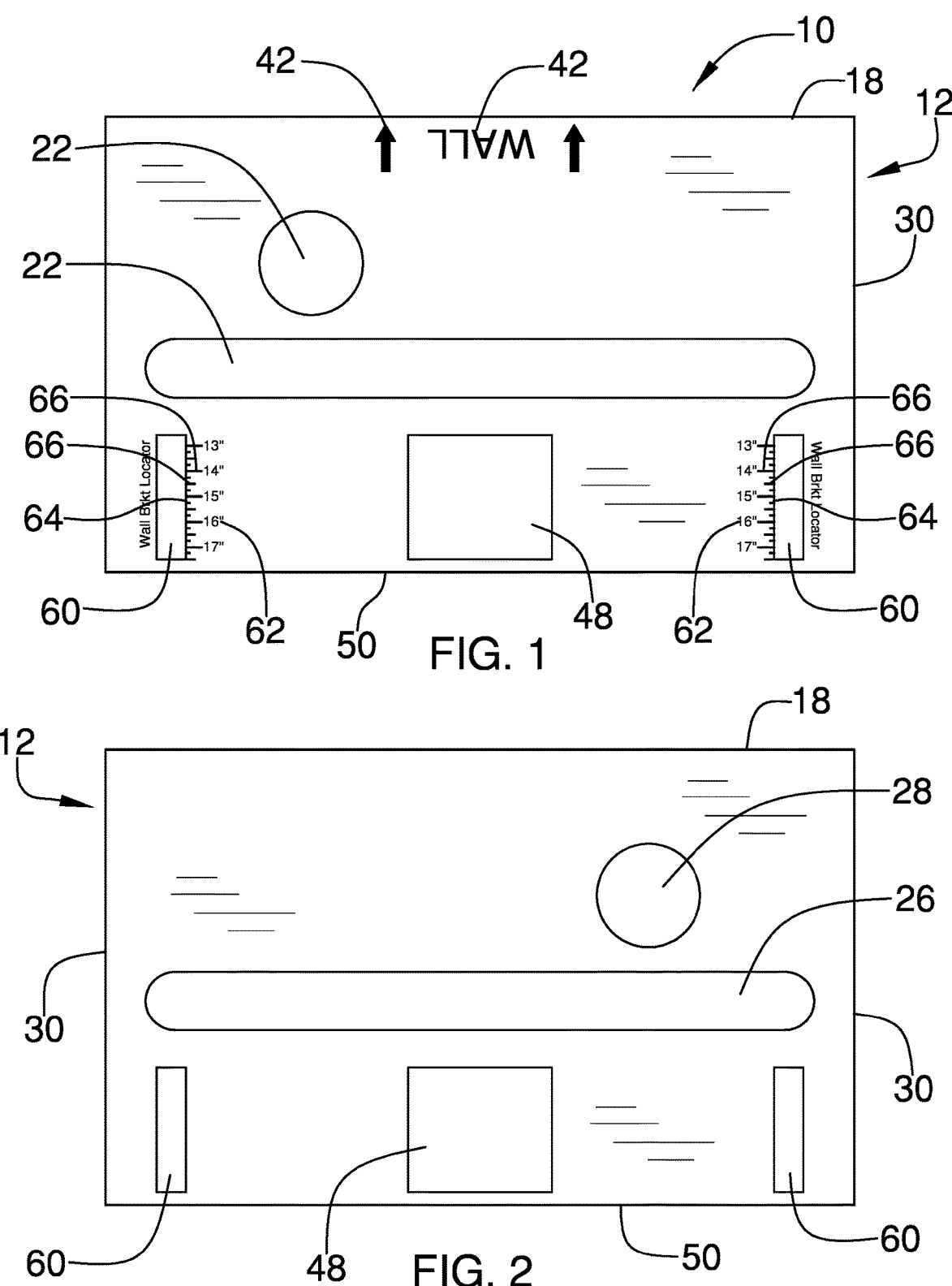
FIG. 1 is a front view of a template positioning device according to an embodiment of the disclosure.
FIG. 2 is a rear view of an embodiment of the disclosure.
Figure 3:
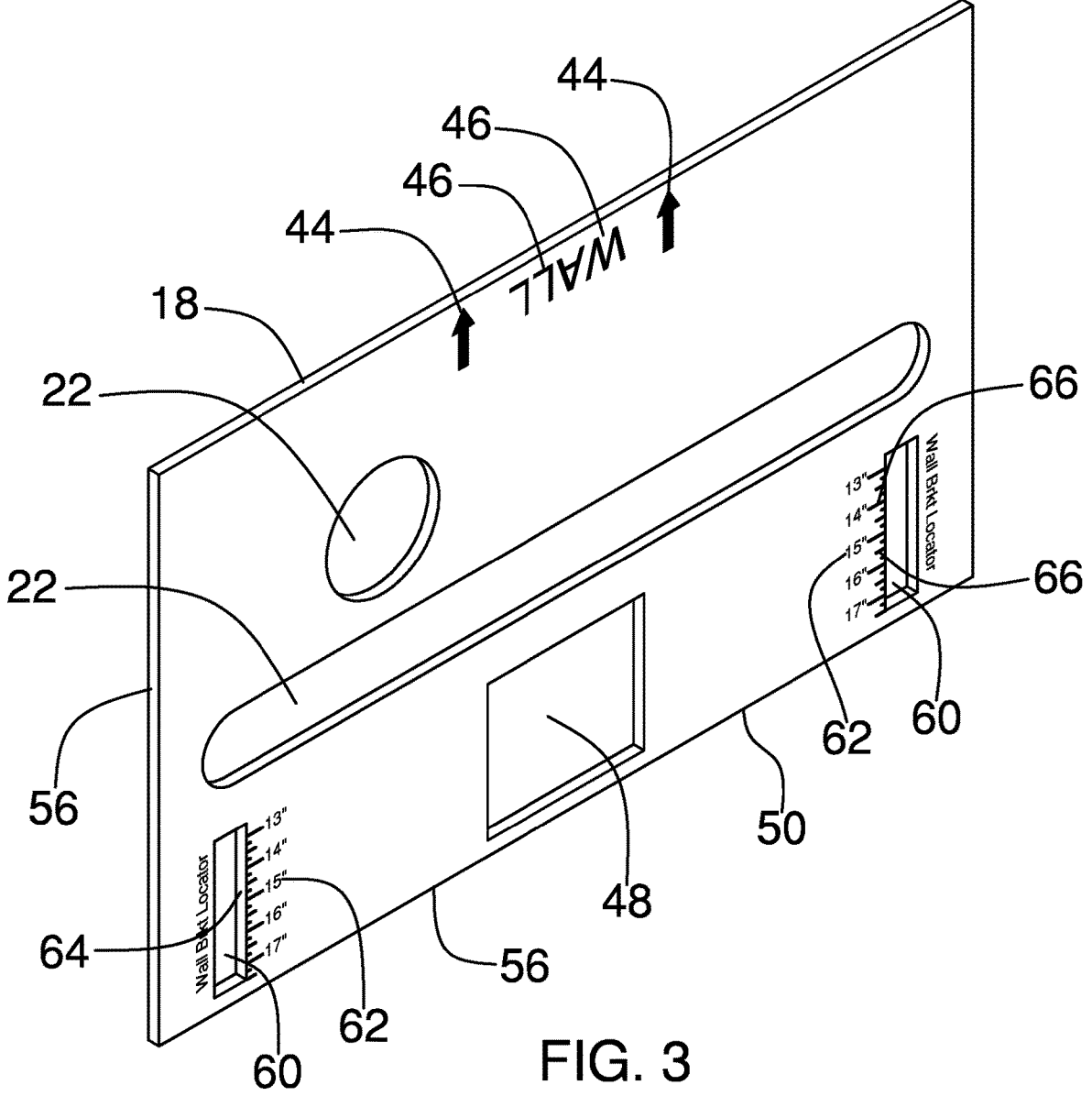
FIG. 3 is a front isometric perspective view of an embodiment of the disclosure.
Figure 4:
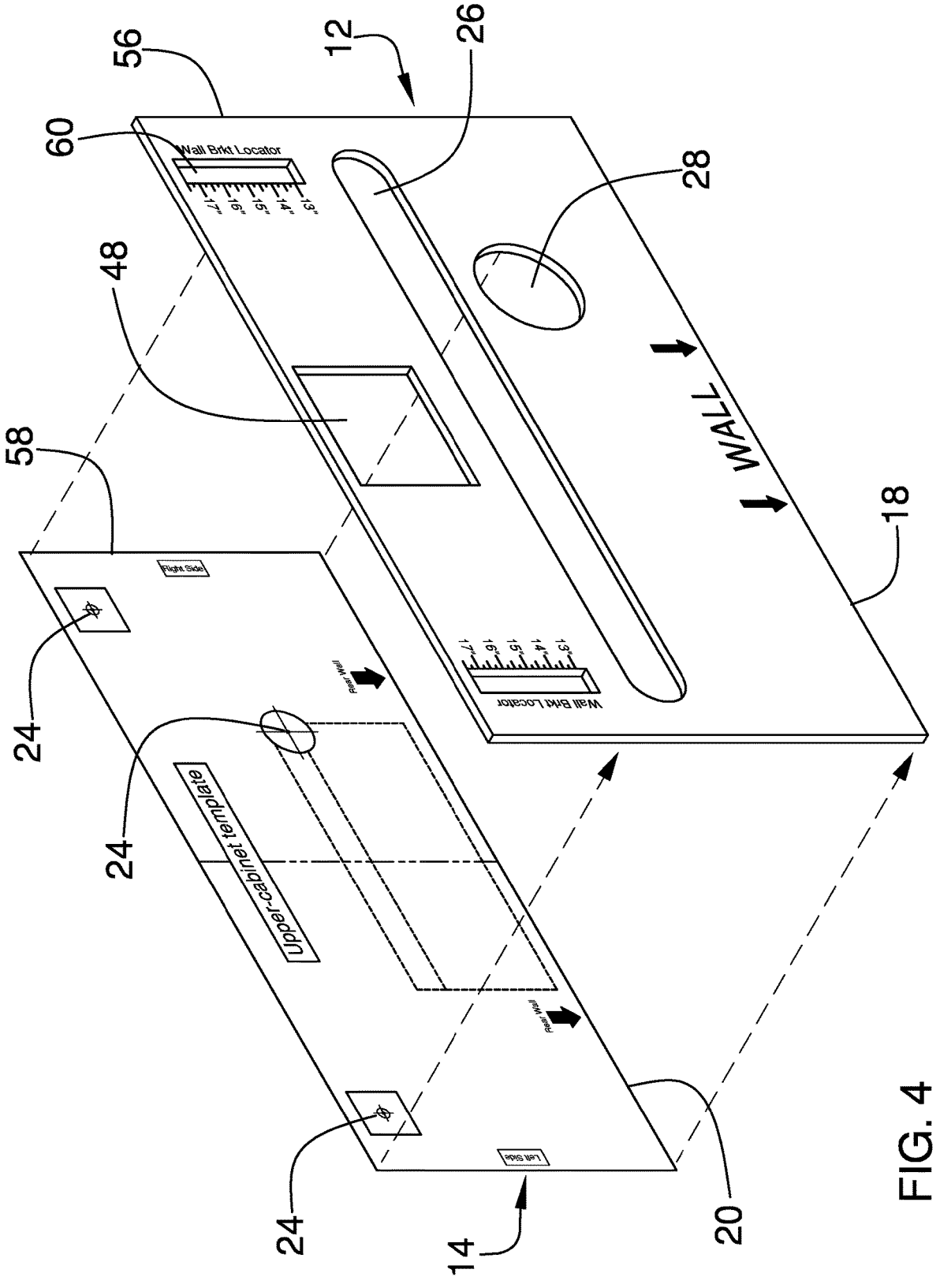
FIG. 4 is an isometric perspective view of an embodiment of the disclosure.

With reference now to the drawings, and in particular to FIGS. 1 through 9 thereof, a new template holder embodying the principles and concepts of an embodiment of the disclosure and generally designated by the reference numeral 10 will be described.

As best illustrated in FIGS. 1 through 9, the template positioning device 10 generally comprises a panel 12, which is substantially rigid, rectangular, and planar. The present invention anticipates the panel 12 comprising wood, plastic, or the like. The present invention also anticipates the panel 12 comprising polycarbonate, polymethyl methacrylate, or the like, and being substantially transparent.

Figure 5:
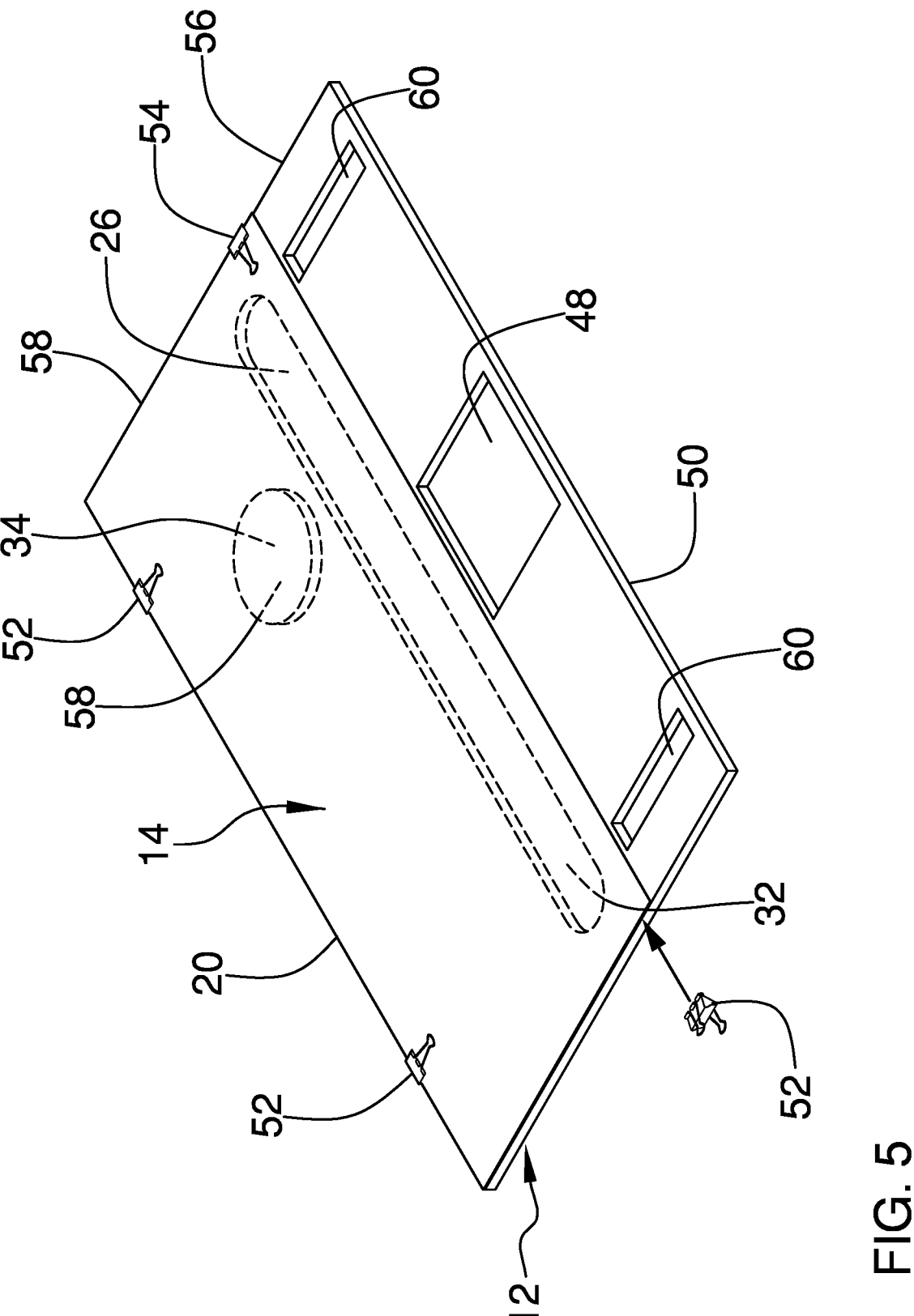
FIG. 5 is a rear isometric perspective view of an embodiment of the disclosure.
Figure 6:
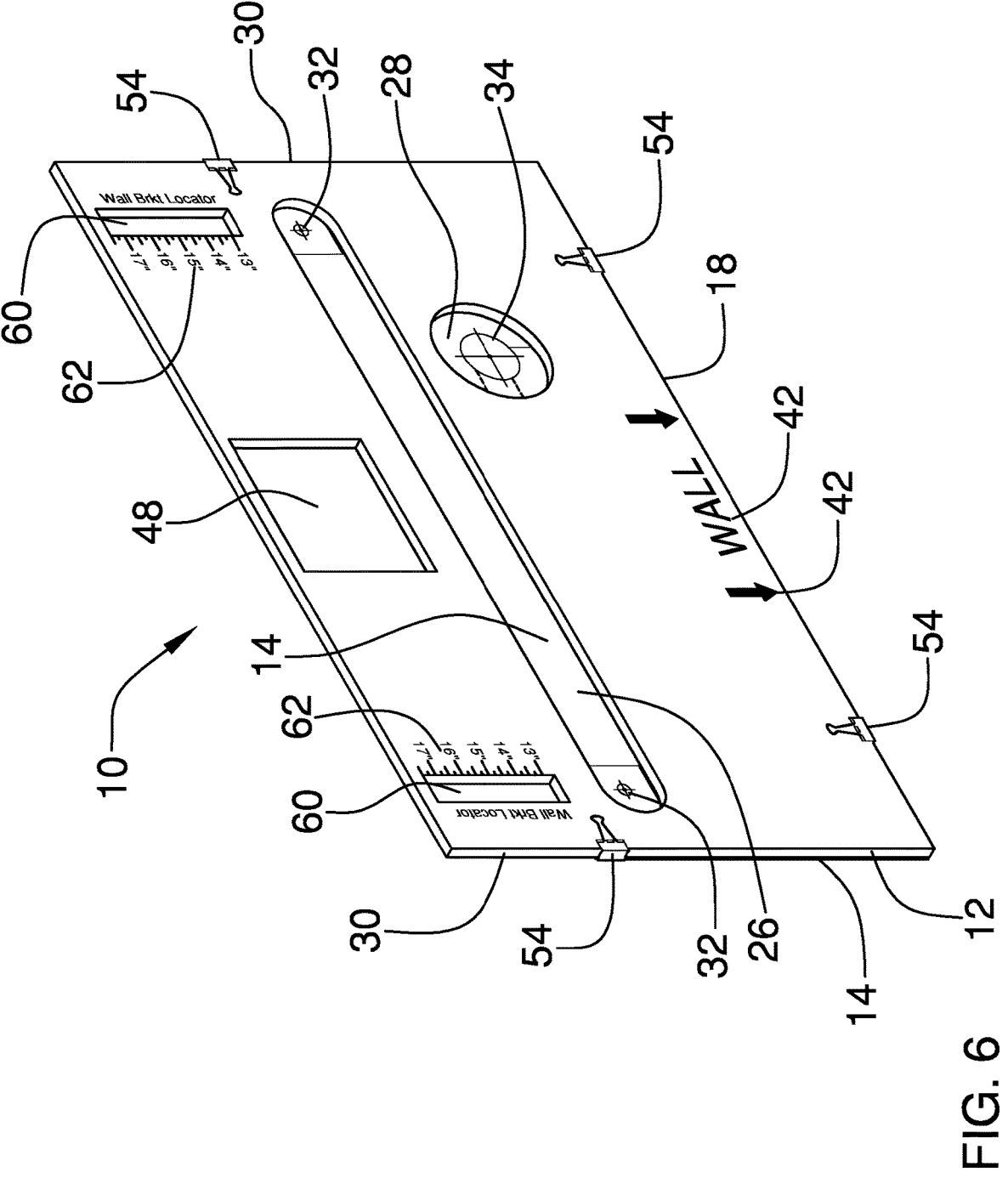
FIG. 6 is a front isometric perspective view of an embodiment of the disclosure.

The panel 12 is configured to overlay and to be removably attached to a template 14 that is used in mounting an under-cabinet microwave 16, as is shown in FIG. 5, with a first edge 18 of the panel 12 being aligned with a rear edge 20 of the template 14. The panel 12 has a plurality of cutouts 22 positioned therein, with respective cutouts 22 allowing access to associated mounting indicators 24 of the template 14. As is shown in FIG. 1, the plurality of cutouts 22 comprises an elongate slot 26 and an orifice 28. The elongate slot 26 extends from proximate to opposed edges 30 of the panel 12 and is parallel to the first edge 18 and allows the user to access mounting bolt hole indicators 32 of the template 14. The orifice 28 is positioned between the elongate slot 26 and the first edge 18 and allows the user to access a plug hole indicator 34 of the template 14.

Figure 7:
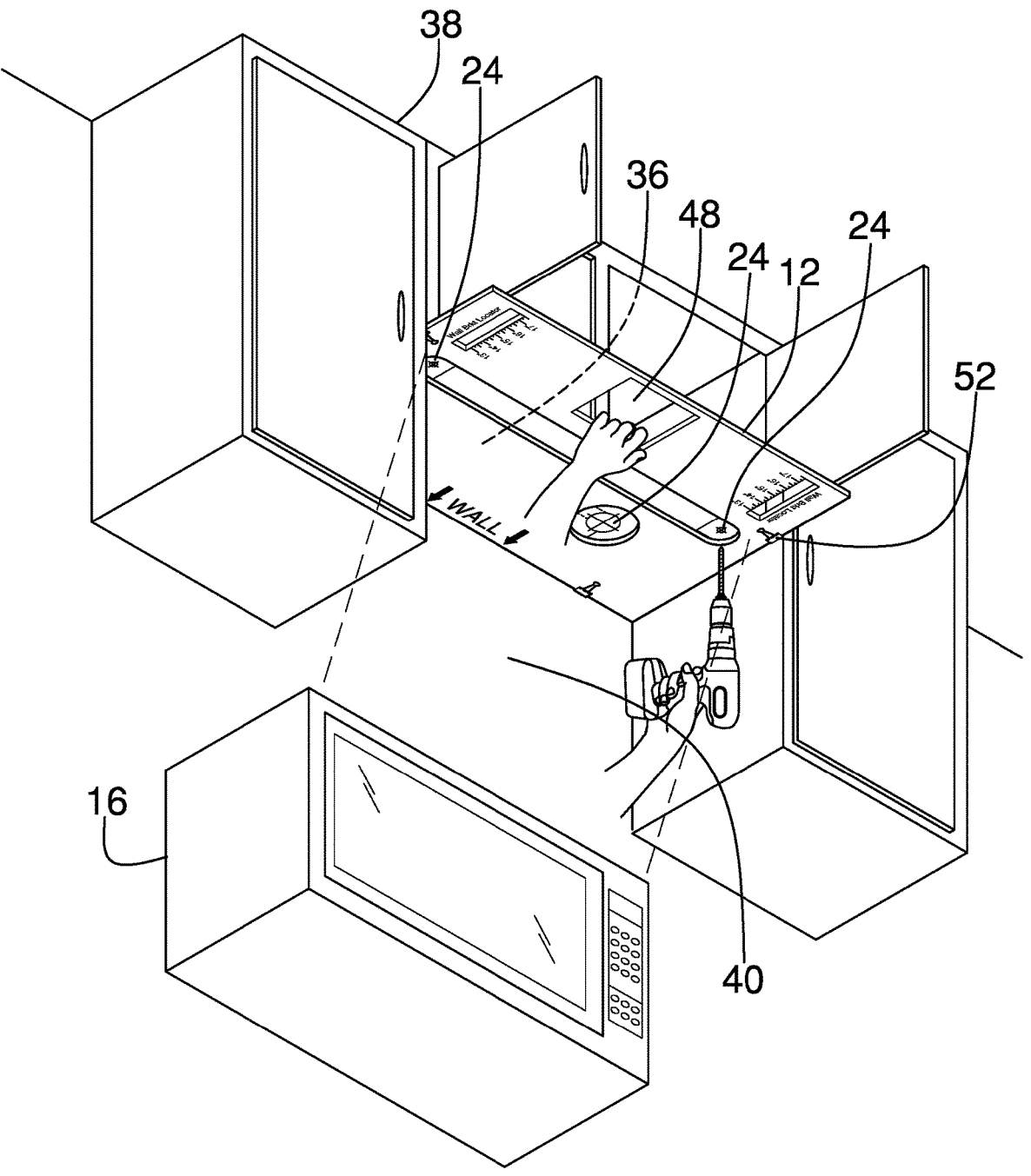
FIG. 7 is an in-use view of an embodiment of the disclosure.

The panel 12 is configured to facilitate proper positioning of the template 14 in abutment to an underside 36 of a cabinet 38, using one hand, with the first edge 18 of the panel 12 against a wall 40 to which the cabinet 38 is mounted, as is shown in FIG. 7. Indicium 42 positioned on the panel 12, proximate to the first edge 18, indicate proper positioning of the panel 12 and the template 14 relative to the underside 36 of the cabinet 38 and the wall 40. The indicium 42 may simply comprise a pair of arrows 44, the arrows 44 of which bracket letters 46 spelling out the word "WALL". The panel 12 also may have a void 48 positioned therein proximate to a second edge 50 of the panel 12 and substantially equally distant from the opposed edges 30 of the panel 12. The void 48 is configured for insertion of digits of a hand of the user, positioning the user to use the digits and a thumb of the hand to clamp the panel 12 and the template 14 to the underside 36 of the cabinet 38.

The template positioning device 10 allows a user to use their other hand to drill holes corresponding to respective mounting indicators 24. Attempting to drill the holes without using the template positioning device 10 is complicated by the template 14 comprising paper and lacking rigidity. The template 14 alone thus hangs down from the underside 36 of the cabinet 38, whereas, with the template 14 is attached to the panel 12, the template 14 can be maintained flush to the underside 36 of the cabinet 38 with the mounting indicators 24 properly positioned and accessible to the user through the cutouts 22.

A plurality of fasteners 52 is attached to, or is attachable to, the panel 12 and is configured to attach to the template 14 so that the template 14 is removably attached to the panel 12 with the first edge 18 of the panel 12 being aligned with the rear edge 20 of the template 14. Each fastener 52 comprises a clip 54, pressure sensitive adhesive, or the like. With the panel 12 overlaying the template 14 and the first edge 18 of the panel 12 aligned with the rear edge 20 of the template 14, the clips 54 can be positioned around a perimeter 56 of the panel 12 and released to engage the template 14 proximate to a circumference 58 of the template 14, thereby retaining the template 14 in position. The present invention also anticipates the template 14 being permanently attached to the panel 12, or integral to the panel 12, as may be desirable for use in repeatedly mounting a particular model of under-cabinet microwave 16 to a particular model of cabinet 38. Such repeated mounting might occur while finishing interiors of modular homes, mobile homes, apartment complexes, or the like.

Figure 8:
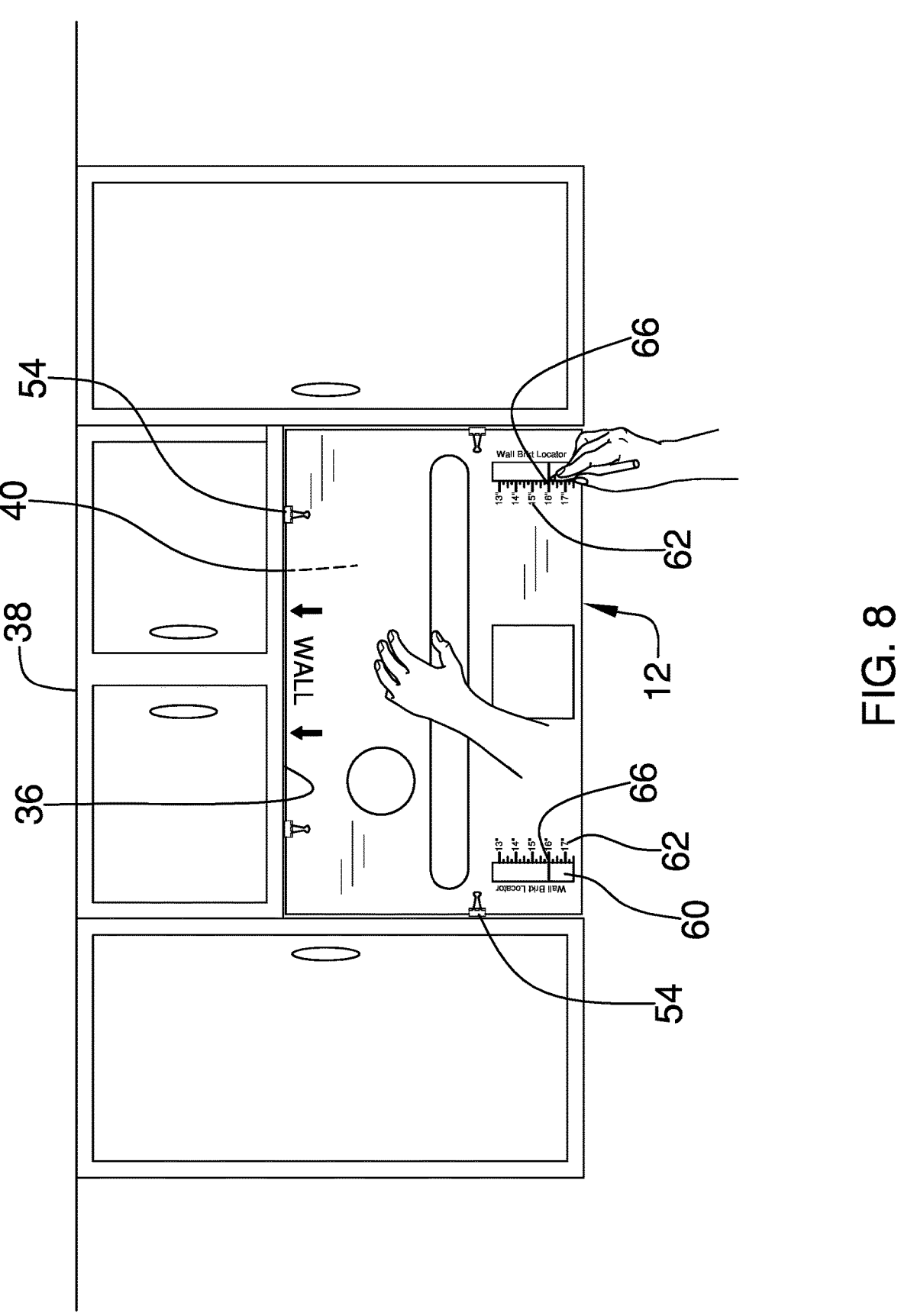
FIG. 8 is an in-use view of an embodiment of the disclosure.
Figure 9:
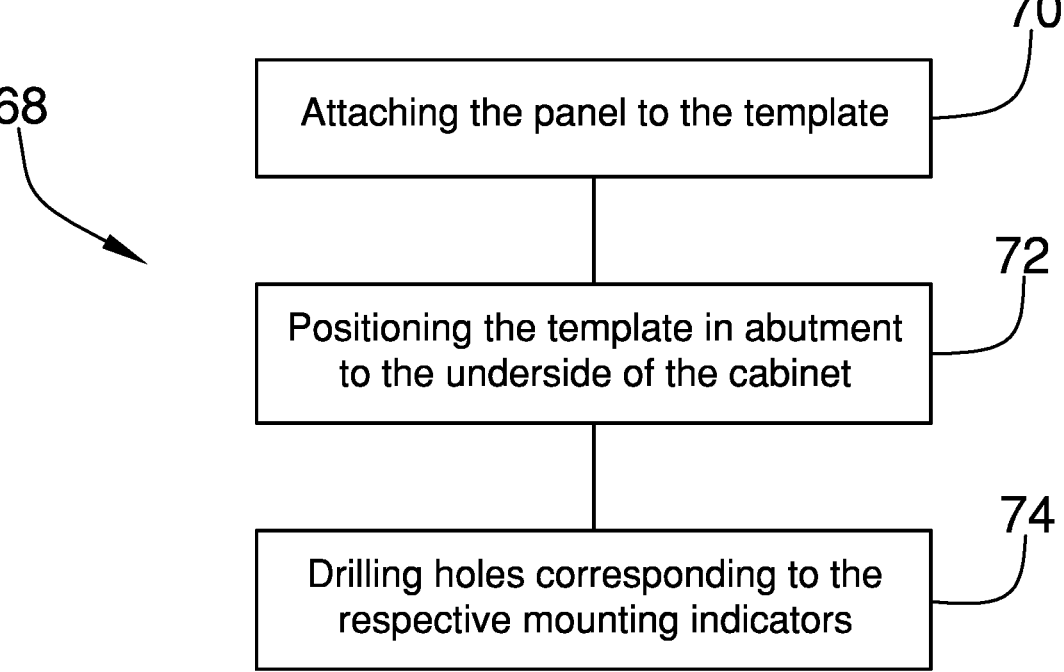
FIG. 9 is a flow diagram for a method utilizing view of an embodiment of the disclosure.

The template positioning device 10 is rendered more useful by the panel 12 having a pair of marking slots 60 positioned therein between the elongate slot 26 and the second edge 50 of the panel 12. Each scale 62 of a pair of scales 62 is attached to the panel 12 and extends along a vertical edge 64 of a respective marking slot 60. The scale 62 comprises a plurality of marks 66, with each mark 66 corresponding to a respective distance from the first edge 18 of the panel 12. The panel 12 thus is configured to facilitate proper positioning of the template 14 in abutment to the wall 40, using one hand, with the first edge 18 of the panel 12 against the cabinet 38. This allows the user to use their other hand to mark the wall 40, at a prescribed distance from the first edge 18, for alignment of a bracket (not shown) that is used in mounting the under-cabinet microwave 16. The marking process is depicted in FIG. 8. The marking slots 60 may be labeled to describe their use, such as with "Wall Brkt Locator." or the like.

In use, the template positioning device 10 enables a method of preparing a cabinet for mounting of an under-cabinet microwave 68. The method 68 comprises providing the template positioning assembly 10 and a first step 70 of attaching the panel 12 to the template 14 to be used in mounting the under-cabinet microwave 16 so that the rear edge 20 of the template 14 is aligned with the first edge 18 of the panel 12. A second step 72 of the method 68 is positioning the template 14 in abutment to the underside 36 of the cabinet 38, using one hand, with the first edge 18 of the panel 12 against the wall 40 to which the cabinet 38 is mounted. A third step 74 of the method 68 is drilling holes corresponding to the respective mounting indicators 24 of the template 14, which are visible through the cutouts 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A template positioning device comprising a panel, the panel being substantially rigid, rectangular, and planar, the panel being configured to overlay and to removably attach to a template used in mounting an under-cabinet microwave, such that a first edge of the panel is aligned with a rear edge of the template, the panel having a plurality of cutouts positioned therein, such that respective cutouts of the plurality of cutouts allow access to associated mounting indicators of the template, wherein the panel is configured to facilitate proper positioning of the template in abutment to an underside of a cabinet, using one hand, with the first edge of the panel against a wall to which the cabinet is mounted, allowing a user to use their other hand to drill holes corresponding to respective mounting indicators.

2. The template positioning device of claim 1, wherein the plurality of cutouts comprises:
   an elongate slot extending from proximate to opposed edges of the panel and being parallel to the first edge, such that the elongate slot allows the user to access mounting bolt hole indicators of the template; and an orifice positioned between the elongate slot and the first edge, such that the orifice allows the user to access a plug hole indicator of the template.

3. The template positioning device of claim 1, further including a plurality of fasteners attached to or attachable to the panel and being configured to attach to the template, such that the template is removably attached to the panel with the first edge of the panel aligned with the rear edge of the template.

4. The template positioning device of claim 3, wherein each fastener comprises a clip.

5. The template positioning device of claim 2, further including:

the panel having a pair of marking slots positioned therein between the elongate slot and a second edge of the panel; and a pair of scales, each scale of the pair of scales being attached to the panel and extending along a vertical edge of a respective marking slot, the scale comprising a plurality of marks, each mark of the plurality of marks corresponding to a respective distance from the first edge of the panel, wherein the panel is configured to facilitate proper positioning of the template in abutment to the wall, using one hand, with the first edge of the panel against the cabinet, allowing the user to use their other hand to mark the wall, at a prescribed distance from the first edge, for alignment of a bracket used in mounting of the under-cabinet microwave.

6. The template positioning device of claim 1, further including indicium positioned on the panel proximate to the first edge to indicate proper positioning of the panel and the template relative to the underside of the cabinet and the wall.

7. The template positioning device of claim 1, wherein the panel has a void positioned therein proximate to a second edge of the panel and substantially equally distant from opposed edges of the panel, wherein the void is configured for insertion of digits of a hand of the user, positioning the user for using the digits and a thumb of the hand to clamp the panel and the template to the underside of the cabinet.

8. A method of preparing a cabinet for mounting of an under-cabinet microwave, the method comprising providing the template positioning assembly according to claim 1, and:

attaching the panel to the template to be used in mounting the under-cabinet microwave, such that the rear edge of the template is aligned with the first edge of the panel;

positioning the template in abutment to the underside of the cabinet, using one hand, with the first edge of the panel against the wall to which the cabinet is mounted; and drilling holes corresponding to the respective mounting indicators of the template that are visible through the cutouts.

\* \* \* \* \*